United States Patent [19]

Kotoyori et al.

[11] 4,206,986

[45] Jun. 10, 1980

[54] EXPOSURE APPARATUS USED FOR THE MANUFACTURE OF A COLOR CATHODE-RAY TUBE PHOSPHOR SCREEN

[75] Inventors: Akira Kotoyori, Ichimiyamachi; Tsuto Nakagawa, Chiba, both of Japan

[73] Assignee: Hitachi, Ltd., Japan

[21] Appl. No.: 860,095

[22] Filed: Dec. 13, 1977

Related U.S. Application Data

[63] Continuation of Ser. No. 710,305, Jul. 30, 1976, abandoned.

[30] Foreign Application Priority Data

Sep. 19, 1975 [JP] Japan .............................. 50-112682
Nov. 7, 1975 [JP] Japan .............................. 50-133048

[51] Int. Cl.$^2$ .......................... G03B 41/00; H01J 9/00
[52] U.S. Cl. .......................... 354/1; 29/25.17
[58] Field of Search .......................... 354/1; 316/23, 29; 313/274; 29/25.17, 25.19, 25.2

[56] References Cited

U.S. PATENT DOCUMENTS

| | | | |
|---|---|---|---|
| 2,817,276 | 12/1957 | Epstein et al. | 354/1 |
| 3,949,411 | 4/1976 | Yonai et al. | 354/1 |
| 4,020,494 | 4/1977 | Pawlikowski et al. | 354/1 |
| 4,050,080 | 9/1977 | Pawlikowski et al. | 354/1 |

*Primary Examiner*—George H. Miller, Jr.
*Assistant Examiner*—Thomas H. Tarcza
*Attorney, Agent, or Firm*—Craig and Antonelli

[57] ABSTRACT

In an exposure apparatus used for manufacture of color cathode-ray tube phosphor screen, a coupling section of an exposure light source to be coupled with a light source receiving portion of a light source housing has a function to previously align a predetermined portion of a light emitting section of the light source positionally in relation to the light source receiving portion. The coupling section of the light source may include an adjustment mechanism which is operatively connected with the light emitting section so as to move it or a member which is rigidly secured to the light emitting section and a predetermined portion of which is aligned with the predetermined portion of the light emitting section. The light source having the adjustment mechanism may be coupled with the light source housing of the exposure apparatus after a desired adjustment has been effected.

8 Claims, 6 Drawing Figures

EXPOSURE APPARATUS USED FOR THE MANUFACTURE OF A COLOR CATHODE-RAY TUBE PHOSPHOR SCREEN

This is a continuation of application Ser. No. 710,305 filed July 30, 1976 now abandoned.

This invention relates to an exposure apparatus used for the manufacture of a color cathode-ray tube phosphor screen and a method for the positioning of an exposure light source in such an exposure apparatus.

For the production of a color cathode-ray tube, it is a general practice to light-expose a phosphor material and photosensitive material coated on the inner surface of a face-plate through a shadow mask or a color selection electrode, thus obtaining an ordinary color phosphor screen or a so-called black matrix type phosphor screen in which a light-absorbing substance is provided between phsophor dots or phosphor stripes.

In a prior art exposure apparatus of a certain type, beams of light emitted from an exposure light source are passed through a condenser lens and projected onto a face-plate through a shadow mask. With this construction, however, the loss of light energy within the condenser lens is so large that the total amount of light emitted from the light source is utilized at an efficiency of only several percent to several tens percent, resulting in a shortcoming that a long exposure time is required.

To obviate this shortcoming, a countermeasure has been proposed wherein the beams of light are directly projected onto the face-plate without being passed through the condenser lens. An exposure apparatus according to this countermeasure comprises a device frame to which the face-plate is mounted, and a light source housing located in the frame to which the light source is mounted. In the light source housing there is provided a cooling means for eliminating heat generated by the light source itself. The cooling means may be a water cooling type using water of a gas cooling type using air or Freon. Incidentally, in order to obtain a highly precise array of phosphor dots, it is necessary to determine the relative position between the face-plate and the light source accurately. To this end, the face-plate is placed on a first adjustment member which supports the face-plate while serving for an accurate positioning thereof, and the light source housing is placed on a second adjustment member for a similar purpose. The relative positioning between the face-plate and the light source is accomplished by manipulating the second adjustment member in relation to a reference of the first adjustment member while lightening the light source which has been mounted in the light source housing. For example, this may be accomplished by means of an alignment mechanism using a microscope for viewing the position of the light source. This measure, however, is disadvantageous in that not only troublesome positioning work is required every time that the light source is exchanged but also the exposure operation is prevented during the exchange, thus greatly reducing the rate of operation of the exposure apparatus.

An object of this invention is to provide an exposure apparatus capable of eliminating the prior art shortcomings and ensuring a highly efficient exposure operation.

Another object of this invention is to provide a method for positioning of exposure light source in such an exposure apparatus.

According to one aspect of this invention, there is provided an exposure apparatus used for the manufacture of a color cathode-ray tube phosphor screen comprising a device frame to which a face-plate is mounted, an exposure light source having a light emitting section including an effective light emitting portion and a coupling section associated with the light emitting section, and a light source housing having a light source receiving portion with which the coupling section of the exposure light source is coupled, wherein the coupling section of the exposure light source includes an adjustment mechanism operatively associated with the light emitting section to align a predetermined portion of the light emitting section positionally in relation to the light source receiving portion of the light source housing.

According to another aspect of this invention, there is provided an exposure apparatus used for the manufacture of a color cathode-ray tube phosphor screen comprising a device frame to which a face-plate is mounted, an exposure light source having a light emitting section including an effective light emitting portion and a coupling section rigidly secured to the light emitting section, and a light source housing having a light source receiving portion with which the second section of the exposure light source is coupled, wherein a predetermined portion of the light emitting section of the exposure light source and a predetermined portion of the coupling section are positionally aligned in relation to the light source receiving portion of the light source housing.

According to still another aspect of this invention, there is provided a method for positioning an exposure light source in an exposure apparatus used for the manufacture of a color cathode-ray tube phosphor screen, comprising a step of preparing an exposure light source having a light emitting section including an effective light emitting portion and a coupling section associated with said light emitting section the a step of coupling the coupling section of the exposure light source with a light source receiving portion of a light source housing of the exposure apparatus, wherein the coupling section of the exposure light source is operatively associated with the light emitting section and the method comprises, before the coupling step, a step of aligning a predetermined portion of the light emitting section of the exposure light source positionally in relation to a predetermined portion of the coupling section in the exterior side of the exposure apparatus.

This invention will become apparent when reading the following detailed description in conjunction with the accompanying drawings, in which.

Prior to describing preferred embodiments of this invention, examples of prior art exposure apparatus will be described with reference to FIGS. 1 and 2.

Figure 1:
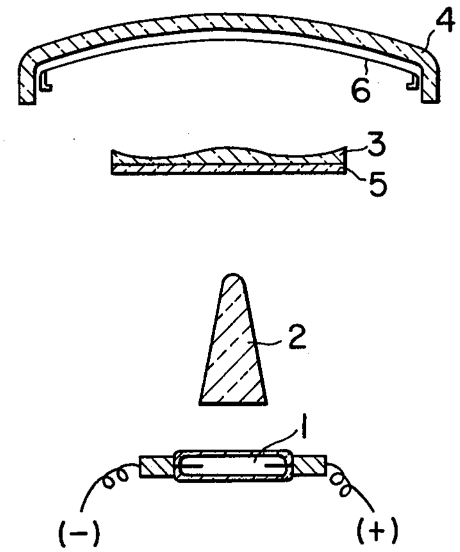
FIG. 1 PRIOR ART
FIG. 1 is a schematic sectional view of one example of a prior art exposure apparatus.

In one example of a prior art exposure apparatus as schematically and diagramatically shown in FIG. 1, beams of light emitted from a super high pressure mercury lamp 1 serving as an exposure light source pass first through a condenser lens 2, then through a correcting lens 3 for approximating the light beams to the locus of electron beams of a color cathode-ray tube and a light quantity correcting filter 5 for correcting the difference in light quantities between the central portion and the peripheral portion of a light-permeable face-plate 4 and finally through a shadow mask or color selection electrode 6 mounted to the face-plate 4 to expose a phosphor material and photo-sensitive material coated on the inner surface of the face-plate 4. In this exposure apparatus, however, the loss of light energy within the condenser lens 2 is so large that the total light flux emitted from the mercury lamp 1 is utilized for an exposure operation at an efficiency of only several percent to several tens percent thereby to reduce the intensity of light beams from a condenser lens top, resulting in a longer exposure time.

Figure 2:
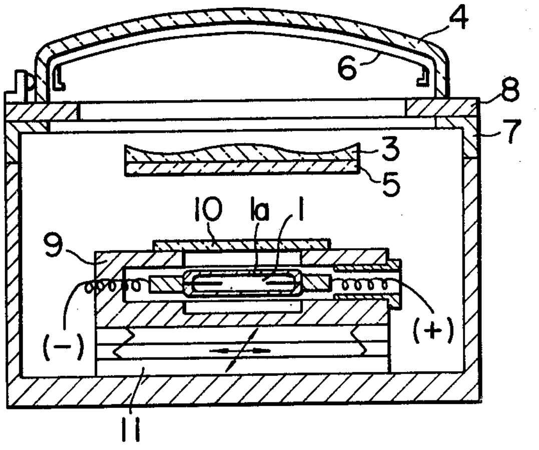
FIG. 2 PRIOR ART
FIG. 2 is a sectional view of another example of a prior art exposure apparatus.

A countermeasure for this shortcoming has been proposed wherein the light beams from the super high pressure mercury lamp 1 are used directly for exposure without being passed through any condenser lens, as shown in FIG. 2. In FIG. 2, a device frame 7 has on its upper portion an adjustment member 8 adapted to support and position the face-plate 4. Inside the frame 7 there provided a light source housing 9 called a "lamp house" to which the mercury lamp 1 is mounted. The light source housing 9 also constitutes a chamber in which a cooling medium is passed for eliminating heat generated in the mercury lamp 1 itself. Numeral 10 designates a transparent window such as made of glass, and numeral 11 designates an adjustment member adapted to support and position the housing 9. During the exposure operation, it is necessary to maintain a highly accurate relative positional relationship between the face-plate 4 and the inner volume portion (or effective light emitting portion) of a quartz tube 1*a* standing for a substantial light emitting source of the mercury lamp 1 in order that trios of blue, green and red phosphor dots or stripes may be formed on the inner surface of face-plate 4 with high accuracy. The relative positioning between the quartz tube 1*a* of mercury lamp 1 and the adjustment member 8 adapted to support and position the face-plate 4 is accomplished by manipulating the adjustment member 11 located beneath the housing 9 in relation to a reference of the adjustment member 8 while lightening the mercury lamp 1 which has been mounted in the housing 9. This measure, however, requires positioning work in every event of exchanging the mercury lamp, during which the exposure operation is prevented, thus greatly reducing the rate of operation of the exposure apparatus.

In addition, an exposure light source such as a super high pressure mercury lamp which is a glass product tends to suffer from an inherent problem arising from the fact that the center of the light emitting portion does not lie on the center axis of a base member of the light source to which the light emitting section is rigidly secured.

This invention contemplates to eliminate the above drawbacks of the prior art apparatus and to solve the problem inherent to the light source. According to this invention, in order to ensure an accurate relative positional relationship between the exposure light source and the face-plate to be exposed, a light source receiving portion of the light source housing is accurately positioned and fixed to a predetermined location and an exposure light source having a light emitting section whose predetermined portion is previously aligned or adjusted positionally in relation to the light source receiving portion is mounted to the light source receiving portion.

The light source receiving portion of the light source housing accommodates a coupling section of the exposure light source, as described hereinafter, which coupling section holds the light emitting section of the light source at a predetermined position and is accommodated in the light source receiving portion in a predetermined relationship. The configurations of the light source receiving portion and the coupling section may be arbitrary as far as the light source receiving portion can accommodate the coupling section in the predetermined relationship. In a preferred example, the light source receiving portion includes a cylindrical aperture which is provided at a selected location of the light source housing and has a predetermined diameter and the coupling section has a cylindrical portion which fits the cylindrical aperture of the light source receiving portion. Alternatively, the aperture of the light source receiving portion may have a polygonal cross section and the coupling section may have a configuration fitting the polygonal aperture.

An accurate positional relationship between the light emitting section and the coupling section is accomplished by fixing and holding the light emitting section in relation to the light source receiving section at a desired position on the basis of a predetermined portion of the coupling section, for example, its peripheral contour, its imaginary axis, etc. Thereafter, this coupling section is coupled with the light source receiving portion so that the accurate positioning of the exposure light source can be achieved.

Since the accurate alignment between the light emitting section and the coupling section can be accomplished on the basis of any desired portion of the coupling section, this aligning operation can be carried out at any location in the exterior side of the exposure apparatus.

Preferably, as a reference in the light emitting section side for alignment there is selected not the outer periphery of the light source tube but a portion contributing to the light emission, i.e. an inner volume portion of the tube (or effective light emitting portion). This is because the outer and inner diameters of the tube generally deviate in their centers from each other.

In a certain type of exposure apparatus, a cooling medium flows inside the light source housing to cool the light source. When such an exposure apparatus is used, it is preferable to carry out the aligning operation between the light emitting section and the coupling section in an atmosphere of a medium identical to the cooling medium which is practically used in the exposure apparatus or light source housing.

The following description will be given in terms of preferred embodiments of this invention with reference to FIGS. 3 to 6. In FIGS. 3 to 6, component parts the same as or similar to those of FIGS. 1 and 2 are designated with the same reference numerals.

Figure 3:
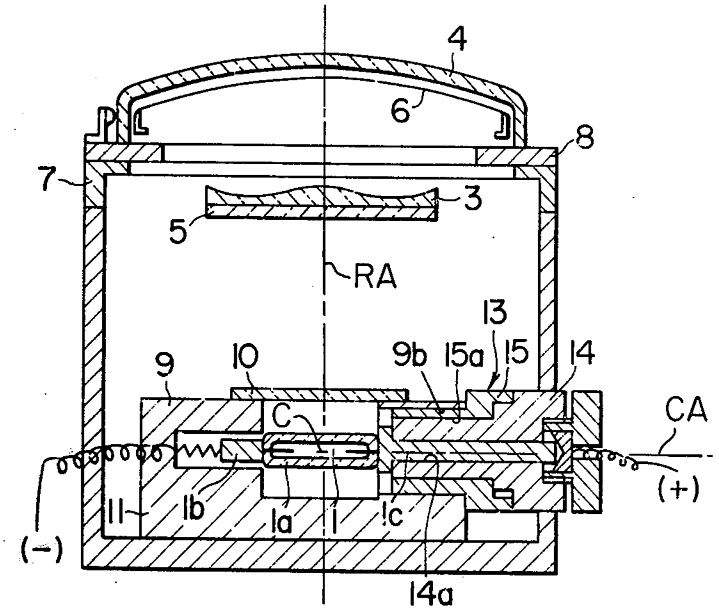
FIG. 3 is a sectional view of one embodiment of an exposure apparatus according to this invention.

In one embodiment, as shown in FIG. 3, a coupling section 13 which is to be coupled with a light source receiving portion or opening 9*b* of a light source housing or lamp house 9 and is associated with a quartz tube 1*a* serving as a light emitting section of super high pressure mercury lamp 1 comprises a base member or lamp base 1c rigidly secured to the quartz tube 1a of the mercury lamp, a first eccentric ring 14 having a hole 14a in which the base member 1c is fitted rotatably, and a second eccentric ring 15 which has a hole 15a and is fitted rotatably to the first eccentric ring 14 and the light source receiving portion 9b of the housing 9. The inner and outer diameters of each of the first eccentric ring 14 and the second eccentric ring 15 are offset. Accordingly, the central axis CA of the coupling section 13 can be aligned with the center C of the inner volume portion (effective light emitting portion) of the quartz tube 1a by making a rotational adjustment of each of the eccentric rings 14 and 15 to an optimum position while observing the offset of the center of the inner volume portion of the quartz tube 1a with respect to the base member 1c of mercury lamp 1. This work is carried out in advance of mounting the mercury lamp 1 to the light source receiving portion 9b of the housing 9. Since the light source receiving portion 9b of the housing 9 has previously been positioned and fixed, with an accuracy sufficient for the exposure operation, in relation to the adjustment member 8 adapted to support and position the face-plate 4, along the reference axis RA the highly accurate relative positional relationship between the face-plate 4 and the inner volume portion of the quartz tube 1a of the mercury lamp 1 serving as the effective light emitting portion can be ensured when the mercury lamp 1 is mounted to the light source receiving portion 9b of the housing 9. Though the case of aligning the inner volume portion of the quartz tube 1a with the center C of the central axis of the CA of the coupling section 13 has been shown and described, the alignment operation is not limited to it. For example, the alignment operation may be carried out in such a manner that a predetermined portion of the quartz tube 1a is located at a predetermined position which is shifted from the central axis of the coupling section 13 by a predetermined distance or which is selected on the basis of the peripheral contour of the second eccentric ring 15. Also, while the embodiment of FIG. 3 has been exemplified with two eccentric rings, obviously, more than three eccentric rings may assure a more accurate adjustment.

Figure 4:
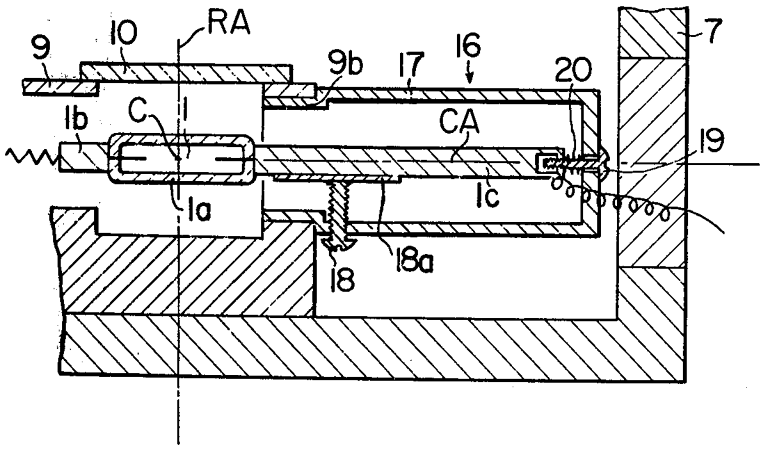
FIG. 4 is a sectional view of another embodiment of an exposure apparatus according to this invention, partly exploded to show an exposure light source.

Referring to FIG. 4 specifically showing an exposure light source of another embodiment of this invention, a coupling section 16 to be coupled with a light source receiving portion of a light source housing 9 provided for a super high pressure mercury lamp 1 comprises a base member 1c rigidly secured to a quartz tube 1a of the mercury lamp 1, a frame member 17, and screws 18 and 19. The screw 18 serves to adjust the position of the mercury lamp 1 in the Z or vertical direction and the other screw 19 does so in the X or horizontal direction. The screw 18 is provided with a relatively large plate 18a by which the mercury lamp 1 is supported. The plate 18a is welded to the screw body 18, as shown, after the mounting of the latter in the frame member 17. Alternatively, the plate 18a may be detachable from the screw body. The screw 19 has a threaded portion with which the base member 1c is coupled and another portion to be associated with the frame member 17, which latter portion is not threaded. A spring 20 is applied around a portion of the screw 19 between the base member 1c and the frame member 17 thereby to permit the mercury lamp 1 to reciprocate in the X-direction. For adjusting the mercury lamp 1 on a plane in a direction perpendicular to the X-direction, that is, in the Y-direction, a screw similar to the screw 19 may also be provided. The screws 18 and 19 are adjusted in advance of mounting the mercury lamp 1 to the housing 9 in such a manner that the center C of the inner volume portion of the quartz tube 1a is aligned with that of the central axis CA coupling section 16, and thereafter, like the foregoing embodiment of FIG. 3, the mercury lamp can be mounted to the housing with a high accuracy for ensuring the positional relationship between the mercury lamp and the face-plate.

It will be appreciated that by adding a mechanism such as screw 19 of FIG. 4, the Y-direction adjustment can be assured in the embodiment of FIG. 3. Obviously, the eccentric ring mechanism of FIG. 3 and the X, Y and Z slide mechanism of FIG. 4 may be used in combination.

Figure 5:
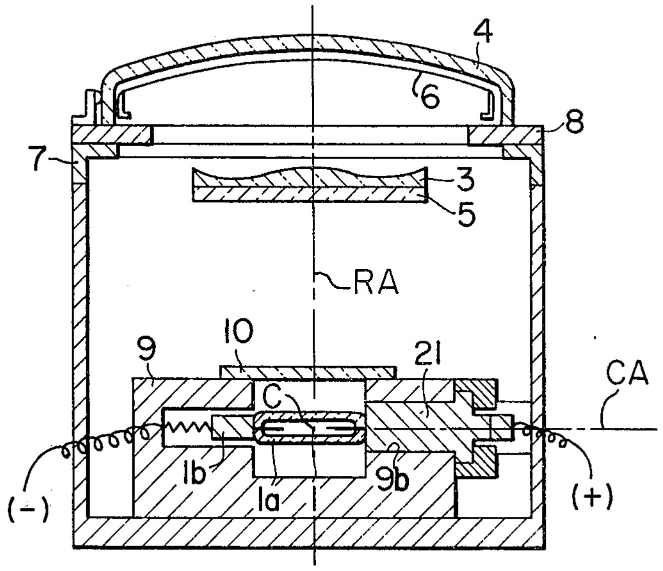
FIG. 5 is a sectional view of still another embodiment of an exposure apparatus according to this invention.

Turning to FIG. 5, still another embodiment uses a super high pressure mercury lamp 1 having a quartz tube 1a whose inner volume portion is aligned with the central axis CA of a coupling section 21 within 0.05 mm accuracy. A light source housing 9 is positioned and fixed previously such that a light source receiving portion 9a of the housing 9 is positioned with respect to an adjustment member 8 with an accuracy necessary and sufficient for exposure operation. Then, when the coupling section 21 centered with the center C of the inner volume portion of the quartz tube 1a is mounted to the light source receiving portion 9a of the housing 9 which has previously been positioned and fixed, a highly accurate relative positional relationship between the face-plate 4 and the quartz tube 1a of mercury lamp 1 serving as an effective light emitting portion can be ensured.

Figure 6:
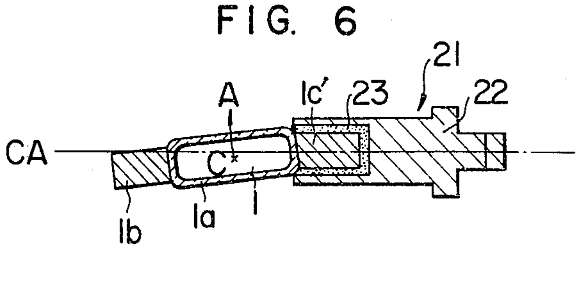
FIG. 6 is a sectional view of one example of an exposure light source shown in FIG. 5.

FIG. 6 shows one example of a manufacturing method for the super high pressure mercury lamp applicable to the embodiment of FIG. 5. It will be seen from FIG. 6 that a center C of the inner volume portion of the quartz tube 1a of a mercury lamp 1 deviates from the center axis CA of a base member 1c' rigidly secured to the quartz tube 1a. Thus, a second member 22 whose outer periphery is to be intimately fitted with the inner wall of the light source receiving portion of the light source housing is prepared, cement material 23 well known in the technical field of lamp production is filled in a gap between the second member 22 and the base member 1c', and the mercury lamp 1 is moved in the direction designated at arrow A by the aid of an appropriate means (not shown) so that the center C of the inner volume of the quartz tube 1a of mercury lamp 1 may lie on the center axis CA of the second member 22. Thereafter, the cement material 23 is heated, cooled and solidified to obtain an intended exposure light source.

While, in the example of FIG. 6, a commercially available super high pressure mercury lamp which has already been provided with common base members 1b and 1c' has been used without applying any alteration to the mercury lamp, obviously, it is possible to prepare the quartz tube 1a itself dispensed with the base member 1c' and then to fill the cement material directly in a gap between the quartz tube 1a and the member 22.

It is to be noted that the foregoing embodiments have been explained by way of the super high pressure mercury lamp an exposure light source but the exposure light source is not limited thereto and may be of any desired types for use in color cathode-ray tube phosphor screen exposure.

Also, in the foregoing embodiments, there has been shown and described the case where the light source receiving portion 9b of the light source housing has a cylindrical configuration and the coupling section of the exposure light source has a cylindrical outer periphery portion coinciding with the cylindrical configuration of the receiving portion 9b. Further, the alignment between the center of the light emitting portion and the central axis of the coupling section has been explained. However, it should be noted that the configurations of the light source receiving portion and the coupling section and the alignment operation are not limited to such special examples as apparent from the earlier-mentioned description.

The aligning operation or work between the light emitting section and coupling section of the exposure light source is convenient if it is carried out in the exterior side of the exposure apparatus in a condition that the coupling section of the light source is coupled with an external member having a configuration which coincides at least partially with the configuration of the light source receiving portion of the light source housing. It is preferable to carry out the aligning operation in an atmosphere of a medium identical to a cooling medium such as water, air or Freon used for cooling the light source in the actual exposure apparatus.

As has been explained, according to the exposure apparatus of this invention, the exposure light source is exchangable and mountable within a very short period with ease and high accuracy.

What is claimed is:

1. An exposure apparatus used for the manufacture of a color cathode-ray tube phosphor screen comprising:
   - a device frame to which a face-plate is to be mounted;
   - a lamp house located in said device frame and having an opening; and
   - an exposure lamp having a light emitting section including an effective light emitting section, a lamp base rigidly secured to said light emitting section, and a supporting and adjusting means which is removably secured to the inner wall of said opening of said lamp house for supporting said lamp base and thereby said light emitting section within said lamp house and which is operatively associated with said lamp base for adjusting the alignment of said effective light emitting section positionally in relation to said lamp house.

2. An exposure apparatus according to claim 1, wherein said supporting and adjusting means of said exposure lamp includes a plurality of eccentric rings which are rotatably mounted on one another and each of which has an inner diameter and outer diameter offset from each other, the inner periphery of the innermost ring of said plural eccentric rings being rotatably fitted in engagement with the outer periphery of said lamp base, and an outer periphery portion of the outermost ring of said plural eccentric rings being rotatably fitted in engagement with the inner wall of said opening of said lamp house.

3. An exposure apparatus according to claim 1, wherein said supporting and adjusting means of said exposure lamp includes a member having its outer periphery portion fitted in engagement with the inner wall of said opening of said lamp house and having therein means operatively associated to said lamp base for moving the position of said lamp base and thereby the position of said effective light emitting portion in at least two different directions.

4. An exposure apparatus according to claim 3, wherein said means for moving includes at least two screws.

5. An exposure apparatus according to claim 1, wherein said supporting and adjusting means of said exposure lamp includes a member having its outer periphery portion fitted in engagement with the inner wall of said opening of said lamp house and having therein a cement material secured to said lamp base.

6. An exposure apparatus according to claim 1, wherein said supporting and adjusting means of said exposure lamp has an outer periphery portion fitted in engagement with the inner wall of said opening of said lamp house.

7. An exposure apparatus according to claim 6, wherein said outer periphery portion of said supporting and adjusting means and said opening of said lamp house are cylindrical.

8. An exposure apparatus according to claim 7, wherein said supporting and adjusting means serves to position the center of said effective light emitting section on a central axis of the cylindrical outer periphery portion of said supporting and adjusting means.

* * * * *